(12) United States Patent
Jones et al.

(10) Patent No.: US 6,282,472 B1
(45) Date of Patent: Aug. 28, 2001

(54) ELECTRIC POWER STEERING SYSTEM WITH BOOST CURVE HAVING PORTIONS DEFINED BY POLYNOMIAL EQUATIONS

(75) Inventors: Russell Wilson Jones, Warwickshire; Andrew James Stephen Williams, West Midlands, both of (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/281,491

(22) Filed: Mar. 30, 1999

(30) Foreign Application Priority Data

Apr. 1, 1998 (GB) .................................................. 9806969

(51) Int. Cl.$^7$ ..................................................... B62D 5/04
(52) U.S. Cl. .............................. 701/41; 701/42; 180/443
(58) Field of Search ........................ 701/41, 42; 180/443

(56) References Cited

U.S. PATENT DOCUMENTS

| | | | |
|---|---|---|---|
| 4,708,220 | * | 11/1987 | Noto et al. ............................ 180/446 |
| 4,819,170 | * | 4/1989 | Shimizu ................................ 701/41 |
| 5,513,107 | * | 4/1996 | Gormley ............................... 701/48 |
| 5,568,389 | * | 10/1996 | McLaughlin et al. ................. 701/41 |
| 5,743,351 | * | 4/1998 | McLaughlin ......................... 180/446 |
| 5,861,725 | * | 1/1999 | Endo et al. ........................... 319/434 |
| 5,979,587 | * | 11/1999 | Liubakka et al. .................... 180/446 |

* cited by examiner

Primary Examiner—William A. Cuchlinski, Jr.
Assistant Examiner—Eric M. Gibson
(74) Attorney, Agent, or Firm—Tarolli, Sundheim, Covel, Tummino & Szabo L.L.P.

(57) ABSTRACT

An electrical power assisted steering system is disclosed having a boost curve which has inverse symmetry about a zero input torque value, each half of the boost curve comprising a first portion defined by a first polynomial equation between a zero value and a first value, and a second portion defined by a second polynomial between a second value and a third value, in which the gradient of the first portion of the curve at the first value is equal to the gradient of the second portion of the curve at the second value. By storing values for the first, second and third values and the gradient of each polynomial at those values a smooth boost curve can be defined by storing only a small amount of parameters.

15 Claims, 8 Drawing Sheets

ELECTRIC POWER STEERING SYSTEM WITH BOOST CURVE HAVING PORTIONS DEFINED BY POLYNOMIAL EQUATIONS

FIELD OF THE INVENTION

This invention relates to improvements in electrical power assisted steering systems of the kind in which an electric motor is adapted to provide an assistance torque in response to an output signal from a torque sensor indicative of the input torque applied to the steering system by the vehicle driver.

BACKGROUND OF THE INVENTION

In a steering system of this kind, where the assistance torque is generated by an electric motor, a 'boost curve' is needed. The boost curve defines the static relationship between the driver applied input torque and the assistance torque produced by the motor. In a simple system, where a linear relationship exists between input torque and output torque, the boost curve may take the form of a straight line.

In a real application, a simple 'straight line' boost curve does not produce satisfactory results. A practical boost curve has several features which provide for an improved driver feel. Firstly, it is desirable to provide for a low-gain region of the curve for small input torques on each side of zero input torque. In the low-gain region, assistance torque is small. This ensures that the steering system is not unnecessarily sensitive to very small adjustments in input torque when travelling in a straight line, for example when maintaining the position of the vehicle in a lane on a highway, but can provide a "progressive" feel when cornering at high vehicle speeds.

Another desirable feature of a practical boost curve is that the gradient of the curve should be high at high levels of input torque. Such high input torques usually occur during parking manoeuvres, and this feature ensures that movement of the steering wheel is eased during such manoeuvres by providing a 'light' steering feel. High input torque could also occur at high vehicle speed during an emergency evassive manoeuvre such as a lane change If the gradient of the curve is high, the curve can be said to have a high gain.

A third desirable feature is that there should be a smooth transition between the low-gain region (for low input torques) and the high gain region (for high input torques). Any sudden step changes in gradient of the curve would be apparent to the driver and produce an unpredictable steering feel.

A final feature of a practical boost curve is that there should be a limit on the level of assistance torque which can be applied by the motor. In many systems, this limit is imposed by limitations of the hardware (i.e. maximum torque of the motor). In other systems, the limit may need to be artificially introduced. Where such a limit exists, the boost curve will be flat (i.e. output torque constant) for input torques which would otherwise result in an assistance torque in excess of the limiting value.

Many of these features are well-known from hydraulic power assisted steering systems. Typically, in a hydraulic system the shape of the boost curve is determined by the profile of a rotary valve which permits varying flow rates of hydraulic fluid at different steering input torques. In an electrical power steering system, the boost curve is preferably provided electronically, for example by a software algorithm. This has the advantage that by providing a speed sensor to measure vehicle speed, it becomes possible to alter the size and shape of the boost curve for varying speeds. One such alteration might be an increase in the width of the low-gain region and reduction in the gain of the low gain region at higher speeds to provide an increase in the perceived stability of the vehicle.

Figure 1A:
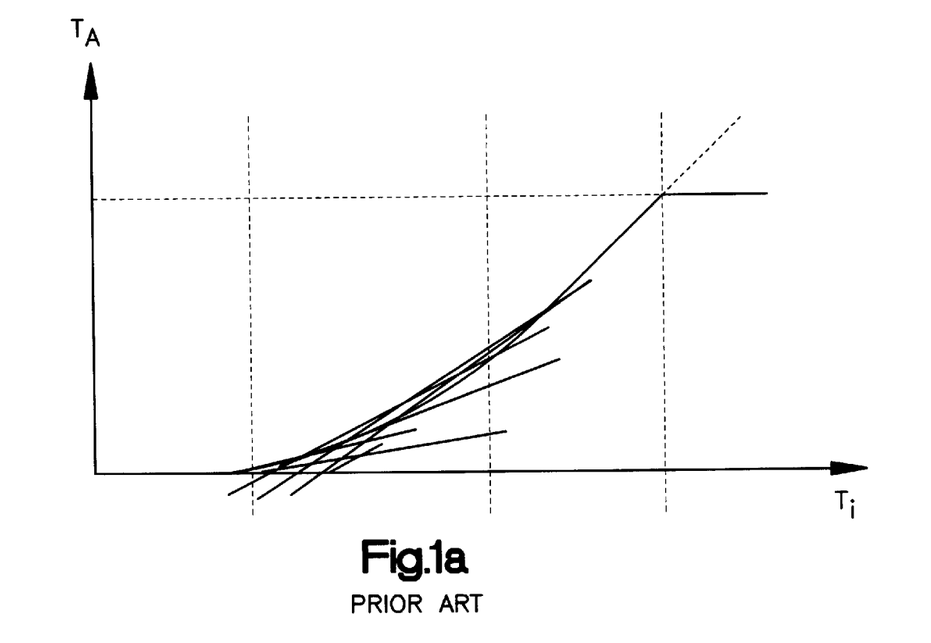
FIG. 1(a) is an illustration of a prior art boost curve defined by a plurality of linear equations to approximate a smooth curve.

In the past, the boost curve has been generated in the form of a piecewise linear approximation of a curve. Such a boost curve comprises a number of portions, each defined by a linear equation. By altering the parameters of the linear equation over each portion, a complex boost curve can be constructed. An example of one such curve is shown in FIG. 1(a) of the drawings.

Figure 1B:
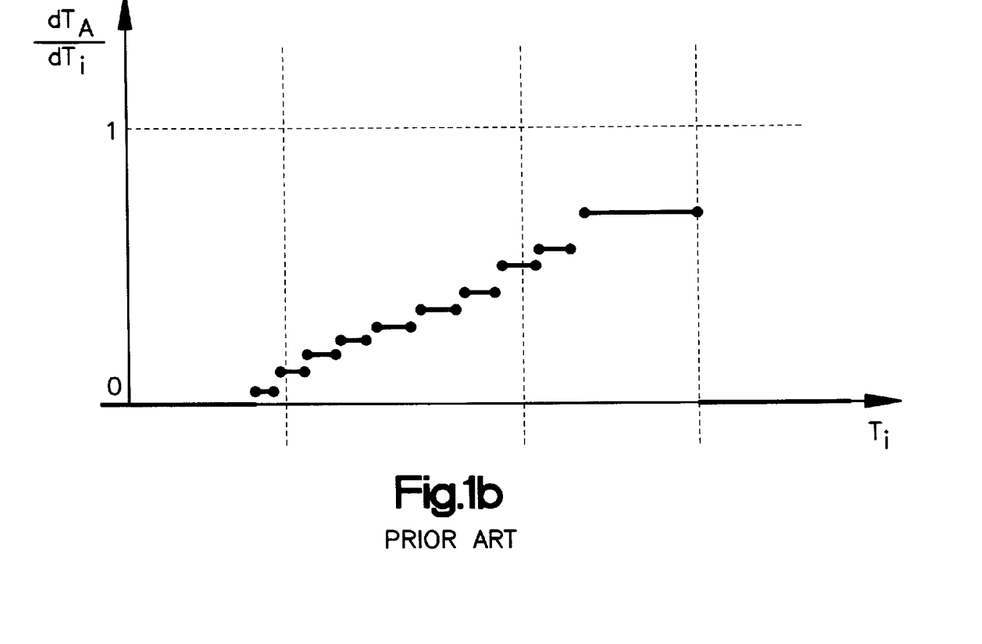
FIG. 1(b) illustrates the derivative of the curve in FIG. 1(a) which exhibits discontinuities at the point of intersection of the linear portions.

A disadvantage of the use of a boost curve in which each portion is defined by a linear equation is that it is not smooth as sudden step changes in gradient occur at the transition from one linear portion to another. This is clearly apparent when a plot is made of the derivative of the boost curve, which features many discontinuities as shown in FIG. 1(b). An improvement in the smoothness of the curve can be obtained by increasing the number of linear equations used and thereby reducing the width of each portion, but this considerably increases the complexity of the curve. Furthermore, changes in the shape of the boost curve cannot readily be achieved due to the high number of variables required to generate the entire curve.

SUMMARY OF THE INVENTION

According to a first aspect, the invention provides an electrical power assisted steering system comprising an input member, an output member, an electric motor coupled to the output member and a torque sensor, the electric motor being adapted to apply an assistance torque to the output member in response to an output signal from the torque sensor indicative of the torque applied to the input member by a driver of the vehicle, characterised in that the relationship between the indicated input torque and the output torque applied by the motor is defined by a boost curve that has inverse symmetry about zero input torque in which the curve on each side of zero input torque comprises at least a first portion defined by a first polynomial equation corresponding to a range of input torque values between a zero value and a first value and a second portion defined by a second polynomial equation corresponding to a range of input torque values between a second value and a third value, in which the gradient of the first portion of the curve at the first value is substantially equal to the gradient of the second portion of the curve at the second value.

The input member and output member may comprise parts of a single unitary member, for example opposite ends of a steering column shaft.

Preferably, a third portion of the curve is defined between the first value and the second value. This portion may be defined by a linear equation. The gradient of the linear equation may be the same as the gradient of the first portion of curve at the first value (and hence by implication the same as the gradient of the second portion of the curve at the second value).

The first polynomial and second polynomials may be of a different form. Indeed, it is preferred that they are. Alternately, they may be the same. The polynomials may be quadratics.

The first and second values may be substantially the same. The zero value may correspond to zero input torque.

A fourth portion of the curve may be defined between the third value and a fourth value. This may be defined by a linear equation.

A fifth portion may be defined between the fourth value and a maximum input magnitude. This portion preferably has zero gradient.

One or more of the first, second, third and fourth values may be variable in use. They may vary with vehicle speed. A memory may be provided and the one or more values may be stored in the memory. They may be stored in an array in an electronic processing unit.

Additionally, the gradient of the boost curve at one or more of the first, second, third and fourth values may be stored in the memory. The gradient value(s) may be variable with vehicle speed. Also, the width of one or more of the portions of the boost curve may be stored in a memory.

The boost curve for the electrical power steering system of the present invention is advantageous over the prior art in that it does not have any sudden changes in gradient as occur when the portions are defined by linear piecewise equations. This ensures smooth steering feel over the whole range. The entire boost curve can also be defined by a minimum of variable or constant parameters.

Preferably, the boost curve has inverse symmetry about the zero input torque.

Preferably the second value of input torque is higher than the first value, the third value of input torque may be higher than the second value, and the fourth value may be higher than the third value.

Thus, the entire boost curve between maximum negative and maximum positive input torque can be easily defined by two quadratic equations, an assistance torque limit and the inverse symmetry about zero input torque. This considerably reduces the number of variables and/or constants required to define the boost curve.

Means may be provided to allow the width of each portion of the boost curve and the gain to be varied to allow the shape and gain of the boost curve to be matched to driving conditions or tailored to an individual driver.

In an especially preferred embodiment, the parameters defining the quadratic and linear portions may be held in a look-up table. Software may be provided to vary these parameters to alter the shape of the boost curve.

A smooth transition may be ensured by providing means for ramping the values of the parameters defining the boost curve slowly over time.

The steering system may incorporate switching means adapted to enable a driver to manually select between at least a first and second boost curve shape and/or gain. This may enable a 'sports' or 'comfort' boost curve to be chosen by the driver to alter the steering feel. In the sports boost curve, less assistance torque may be provided than in the comfort setting, thus providing a heavier steering feel.

The steering system may be adapted to receive a vehicle speed signal indicative of the speed of the vehicle. In turn, the system may alter the shape of the boost curve for different vehicle speeds.

The system may also include means for automatically altering the boost curve to suit different drivers. For example, this may comprise an identifying transponder which is unique to each driver. Thus, as the driver enters and starts the car, the steering system may automatically select the correct shape of boost curve. The boost curves may be predefined or user defined by each driver.

The steering system may incorporate means to facilitate a smooth transition from one boost curve shape to another. For example, the shape of the curve may be varied smoothly as the vehicle speed changes.

In an especially advantageous embodiment, the boost curve is fully defined by six parameters: width of the first (quadratic) portion $q_{1w}$, gradient of the third (linear) portion $g_1$, the second input value $q_{2s}$—corresponding to the start of the second (quadratic) portion, the width of the second (quadratic) portion $q_{2w}$, the gradient of the fourth (linear) portion $g_2$, and the maximum assistance torque $T_{A(MAX)}$—which defines the fourth input value.

All six values may be stored in a memory such as an electronic memory. The six values may differ for various vehicle speeds. In this case, a number of sets of six values, each corresponding to a boost curve at a different vehicle speed, may be stored in a memory. Interpolation may be used to select the required set of values at intermediate vehicle speeds.

Means may be provided to construct the boost curve from the six parameters.

Thus, the invention comprises apparatus for producing a boost curve from a small set of key parameters which define essential features of the curve. This means a curve can be defined in a small amount of memory.

The one or more values may be user definable. Thus, it is relatively trivial to produce different boost curves for different vehicles by changing the values of the one or more variables in the memory. Thus, the number of variables is advantageously small whilst providing for a smooth boost curve.

BRIEF DESCRIPTION OF THE DRAWINGS

There will now be described, by way of example only, one embodiment of the present invention with reference to the accompanying drawings in which.

DETAILED DESCRIPTION OF THE INVENTION

Within an electrical power assisted steering system of the kind set forth there exists a requirement for a 'boost curve'.

This defines the static relationship between the input torque and the assistance torque generated by the electric motor.

Figure 2:
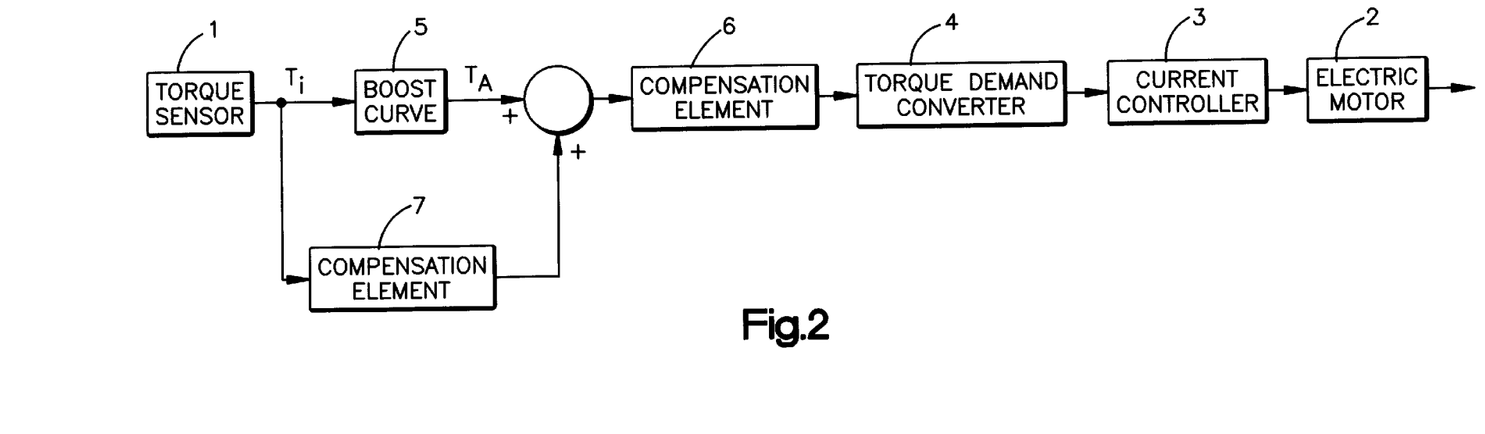
FIG. 2 is a simplified block diagram of the control strategy for the electrical power steering system.

FIG. 2 shows a simplified block diagram of the control algorithm for an EPAS system. The input torque $T_i$ is measured by the use of a sensing device such as a torque sensor 1 and a signal conditioning unit. The signal produced by the torque sensor is nominally proportional to the level of torque applied by the driver to the input column of the steering system. The assistance torque is produced by passing an electric current through an electric motor 2, and is generally proportional to the applied current produced by a current controller 3.

The boost curve 5 gives the static relationship between input torque and the assistance torque $T_A$. The dynamic relationship between these two parameters is determined by series applied and parallel applied compensation elements 6, 7. For example, a parallel phase network and a series low pass filter network can be used. A torque demand converter 4 converts the torque demand into a current demand for input into the motor current controller 3.

Figure 3:
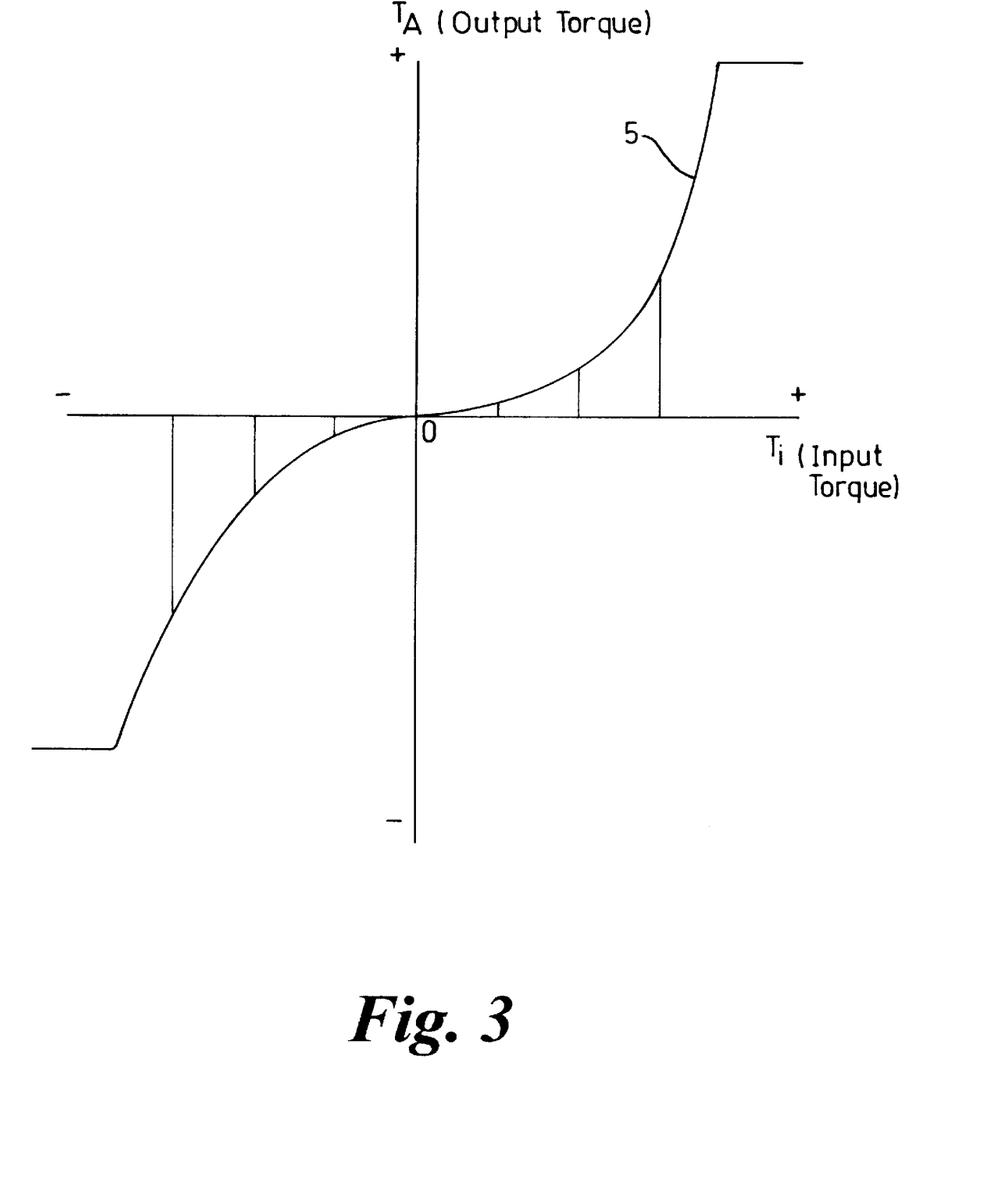
FIG. 3 is an illustration showing the various portions of the continuous smooth boost curve which can be produced in accordance with the present invention.

A boost curve in accordance with the present invention is shown in FIG. 3. The boost curve 5 is shown for positive input torques in FIG. 4. The boost curve possesses inverse symmetry about zero input torque, and this is a general requirement for all suitable boost curves.

Figure 4:
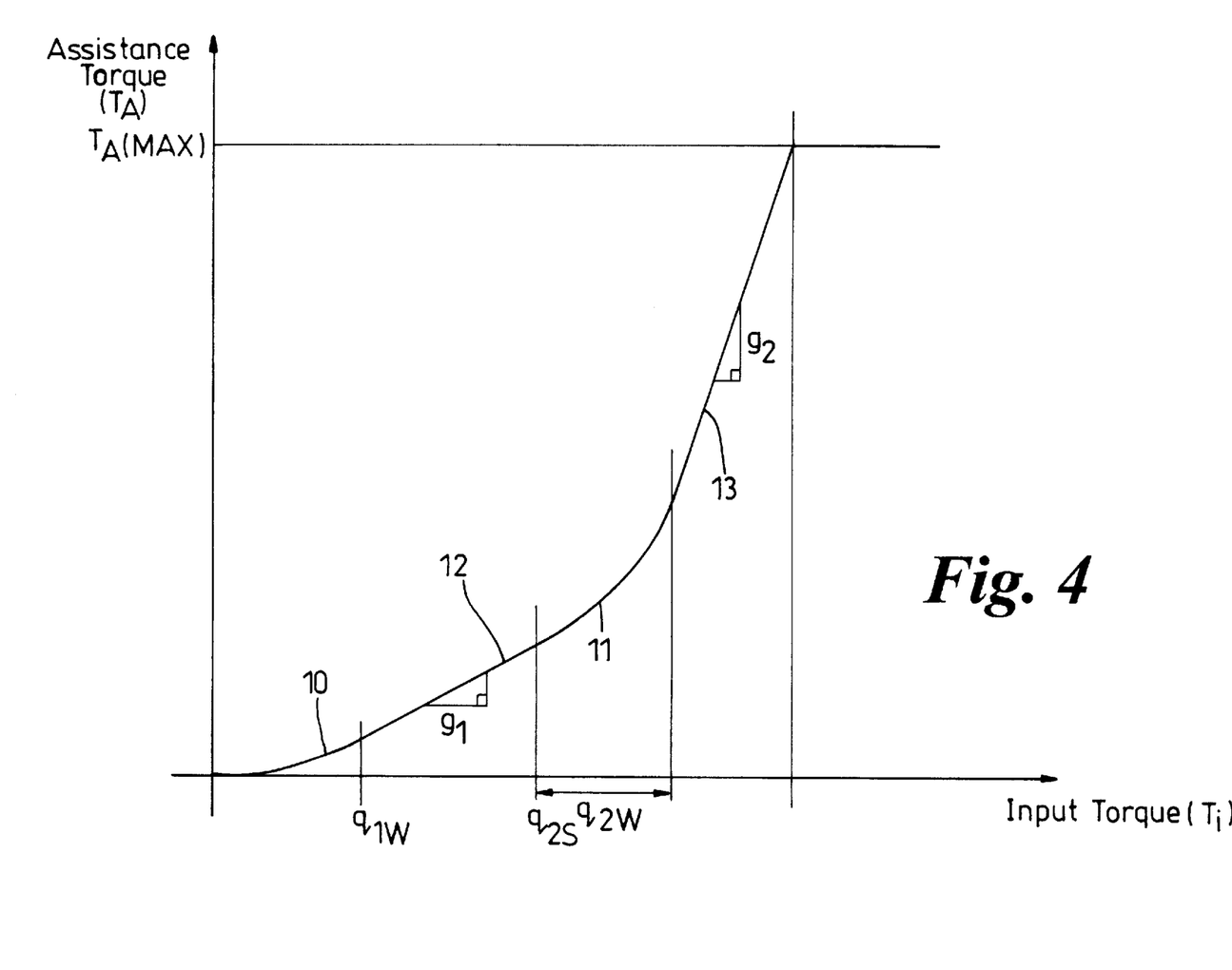
FIG. 4 is an enlarged view of one quadrant of the boost curve defined by the linear equations and the quadratic equation suitable to define a smooth boost curve such as shown in FIG. 3.

The boost curve shown in FIG. 4 has five distinct portions. A first quadratic portion 10 defined by a quadratic equation extends between zero input torque and a first input torque value $q_{1w}$. The gradient of the quadratic at input value $q_{1w}$ is denoted $g_1$. A second quadratic portion 11 defined by a quadratic equation extends from a second input torque value $q_{2s}$ to a third input torque value. The third value is defined relative to the second input value by defining the width of the second quadratic portion as $q_{2w}$. Thus, the third value is given by $q_{2s}+q_{2w}$. The gradient of the second quadratic at the second input value is chosen to be equal to that of the boost curve at the first input torque value.

A third linear portion 12 extends between the first and second quadratics. The gradient of the linear portion is given as $g_1$, and is the same as the gradient of the quadratic curves where they meet the third portion. Thus, a seamless curve from the zero value to the third value is produced. The derivative of the boost curve therefore does not have any discontinuities over this range of values.

A fourth linear portion 13 is defined between the third value and a fourth input value which corresponds to a maximum permitted assistance torque $T_{A(max)}$. The gradient $g_2$ of the fourth linear portion is the same as that of the second quadratic portion at the third input torque value. Above the fourth input value, the curve is flat. Over this fifth portion, any increases in input torque do not produce corresponding increases in assistance torque. In some systems, this maximum assistance torque value will be set by limitations in hardware, such as the maximum torque that can be produced by the motor, or may be deliberately introduced in software to prevent undesirable high assistance torque levels.

The smooth boost curve 5 can be defined in software with only a small number of parameters to set the characteristics of the various portions (i.e. the range of input torque values corresponding to each of the quadratic and linear portions, the gradient of the linear portions 12 and 13, and the limiting torque value $T_{A(max)}$.

To ensure that the boost curve is smooth so that the derivative of the curve is continuous, the quadratic portion and linear portion must satisfy several rules. The following calculation can be used to define the boost curve parameters.

The optimum boost curve function varies with vehicle speed for any given vehicle model, and is usually determined subjectively by test drivers, and supported by objective measurements of various vehicle parameters such as driver torque, steering wheel angular velocity, steering wheel angular position, vehicle yaw rate, vehicle lateral acceleration and vehicle speed, during defined steering manoeuvres.

The principle of the design presented here is that a complete boost curve is defined (by a parameter set) at several individual specified vehicle speeds, for example at 0, 10, 20, ..., 200 km/h. At vehicle speeds between those at which the parameters are explicitly specified, the actual parameter set used is to be determined by linear interpolation of each parameter according to the actual vehicle speed and to the parameters defined at the two adjacent surrounding vehicle speed points.

In the design presented here, the boost curve is defined by six parameters, described below. Each of the six parameters can be stored at each of several predefined vehicle speed points, as described above, but it may be possible to simplify the tuning process further (and reduce the memory requirements of the system) by defining one or more of the parameters as vehicle speed-independent quantity.

The polarity of the output is always equal to the polarity of the input, and as the function is mirrored about the line $T_A = -T_i$, it is only necessary to define the form of the boost curve in the first quadrant of the $T_i$-$T_A$ axes in order to completely define it.

As stated hereinbefore, the five portions of the boost curve are defined by the parameters:

Parameter 1: $q_{1w}$ Width of first (quadratic) portion
Parameter 2: $g_1$ Gradient of third (linear) portion
Parameter 3: $q_{2s}$ Start of second (quadratic) portion
Parameter 4: $q_{2w}$ Width of second (quadratic) portion
Parameter 5: $g_2$ Gradient of fourth (linear) portion
Parameter 6: $T_{A(max)}$ Maximum assistance torque The mathematical definition of each portion of the boost curve in the first quadrant is presented below; where $|T_i|$ denotes the absolute value of $T_i$.

$$T_A = (g_1 \times |T_i|^2) \div (2 \times q_{1w}) \qquad \text{First Portion}$$

$$T_A = \{[(g_2 - g_1) \times (|T_i| - q_{2s})^2] \div (2 \times q_{2w})\} + \\ [g_1 \times (|T_i| - q_{2s})] + \{g_1 \times [q_{2s} - (q_{1w} \div 2)]\} \qquad \text{Second Portion}$$

$$T_A = [g_1 \times (|T_i| - q_{1w})] + [(g_1 \times q_{1w}) \div 2] \qquad \text{Third Portion}$$

$$T_A = [g_2 \times (|T_i| - q_{2s} - q_{2w})] + \\ \{g_1 \times [q_{2s} - (q_{1w} \div 2) + (q_{2w} \div 2)]\} + (g_2 \times q_{2w} \div 2) \qquad \text{Fourth Portion}$$

$$T_A = T_{A(max)} \qquad \text{Fifth Portion}$$

To determine the actual boost assistance torque $T_A$, the following procedure is used:

IF $|T_D| < q_{1w}$ THEN
    Calculate $T_A$ using definition for first portion above
ELSE IF $|T_D| < q_{2s}$ THEN
    Calculate $T_A$ using definition for third portion above
ELSE IF $|T_D| < (q_{2s}+q_{2w})$ THEN
    Calculate $T_A$ using definition for second portion above
ELSE
    Calculate $T_A$ using definition for fourth portion
END IF Then, in the next stage, the calculated value of $T_A$ is limited to a maximum value of $T_{A(max)}$ according to the definition for fifth section above:

IF $T_A > T_{A(max)}$ THEN
  $T_A = T_{A(max)}$
END IF

The sign of $T_A$ is then set equal to the sign of $T_i$:

$$T_A = T_A \times \text{sign}(T_i)$$

This procedure is followed to calculate the assistance torque demand $T_A$ for any given driver input torque $T_i$ using the parameter set $[q_{1w}, g_1, q_{2s}, q_{2w}, g_2, T_{A(max)}]$. Each of the parameters in the set may have been obtained by linear interpolation from a table of values according to the measured vehicle speed.

The simplicity of the parameters defining the boost curve enables the shape of the curve to be altered with a minimum of computation.

Figure 5:
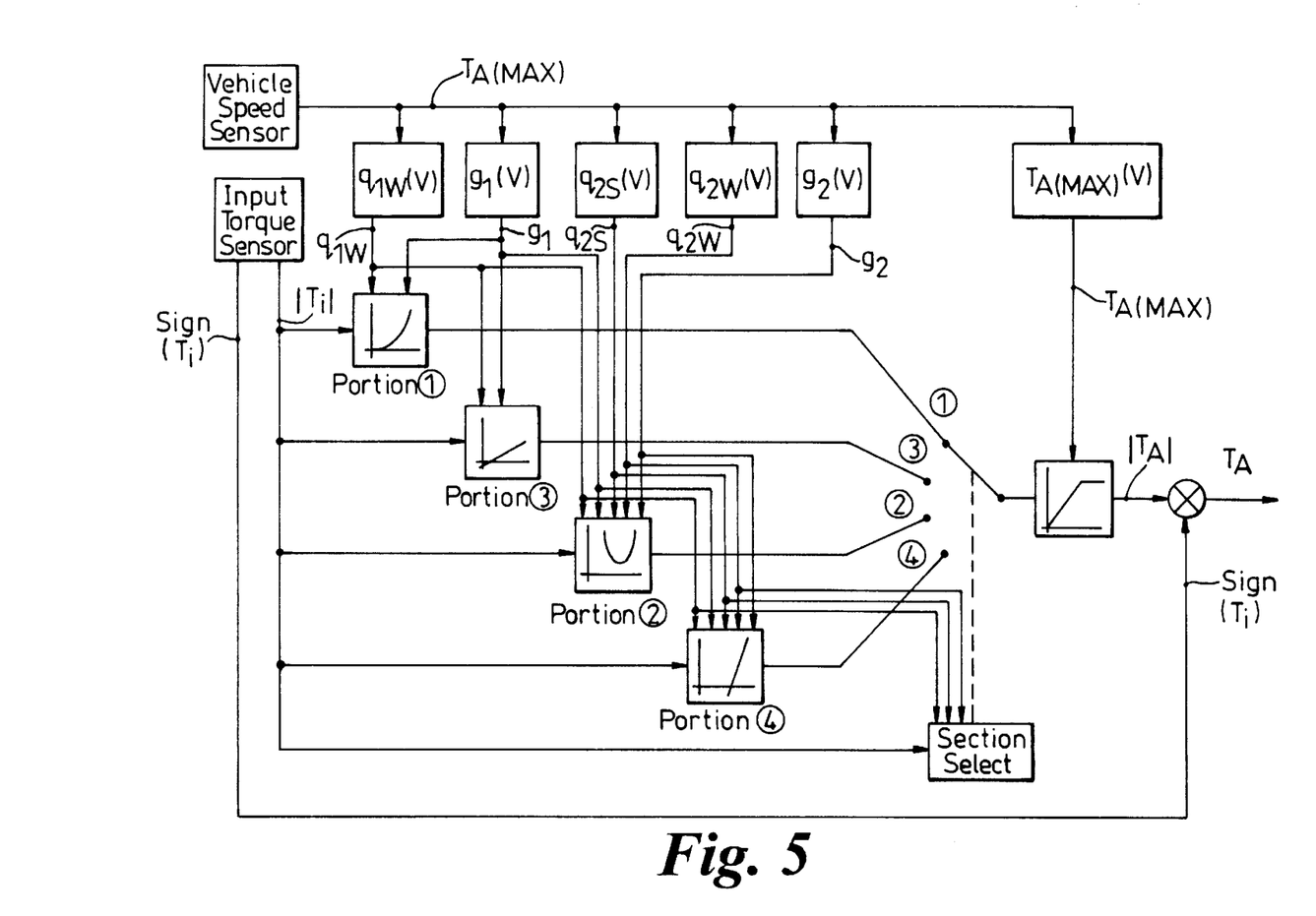
FIG. 5 is a block schematic diagram showing the various steps performed in generating an output torque for a corresponding input torque by utilising the boost curve.

FIG. 5 illustrates one way in which the boost curve described hereinbefore may be embodied in an electrical power assisted steering system.

Initially, the input torque value $T_i$ is separated into a magnitude component and a sign component. This can be done mathematically by evaluating $T_i$ and $$\frac{T_i}{|T_i|}$$

or by employing a suitable software subroutine.

A measurement of vehicle speed V is then obtained from a vehicle speed sensor. Each of the individual portions of the boost curve are then produced before they are all passed to a combining unit which combines the values to produce the final boost curve. The sign of the input torque is then applied to the final boost curve to produce a symmetrical boost curve.

Figure 7:
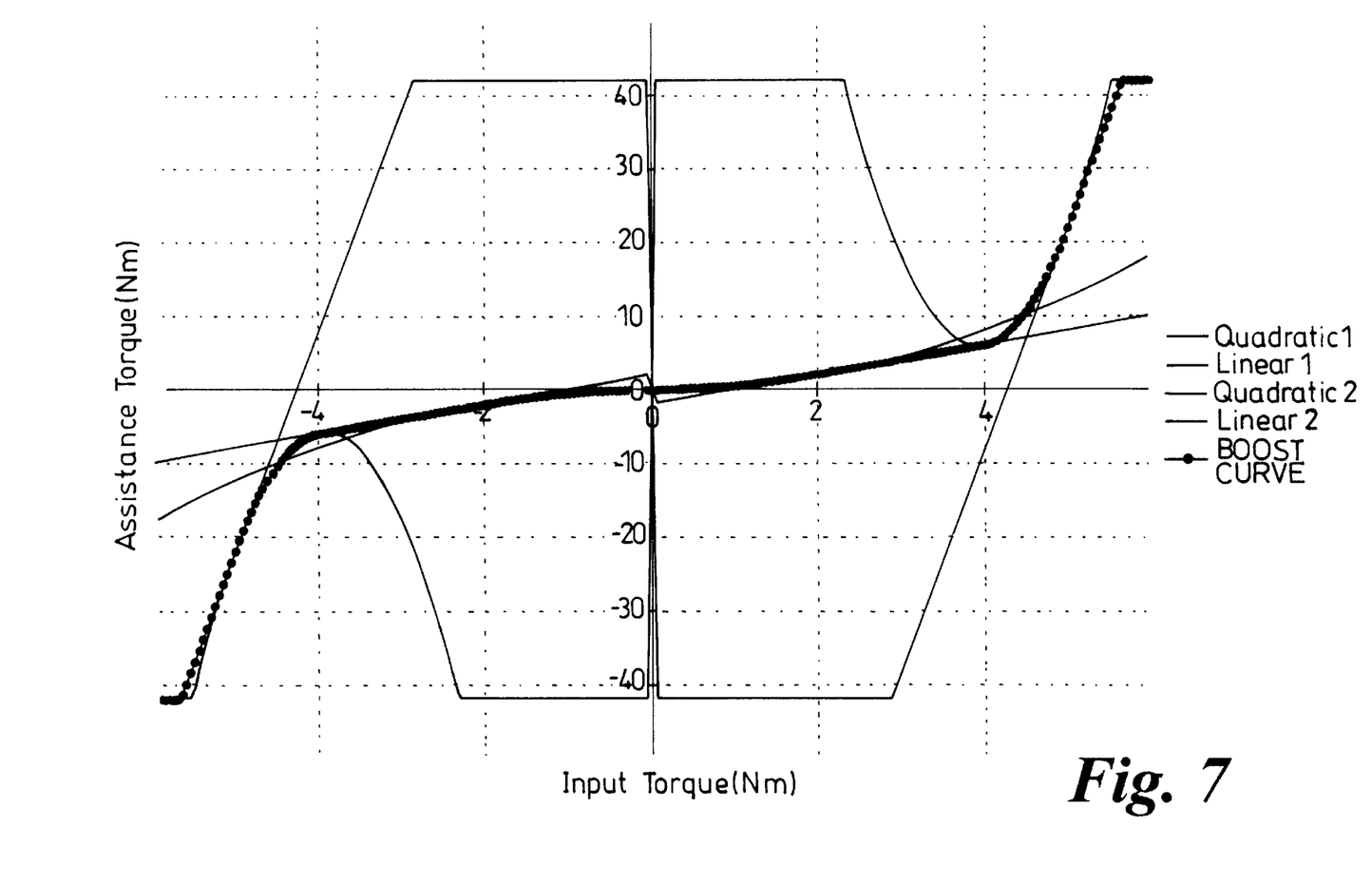
FIG. 7 illustrates how a complete curve is produced by addition of the various portions of curve.

The way in which the individual portions of the curve are combined to produce a complete curve is shown in FIG. 7.

Figure 8A:
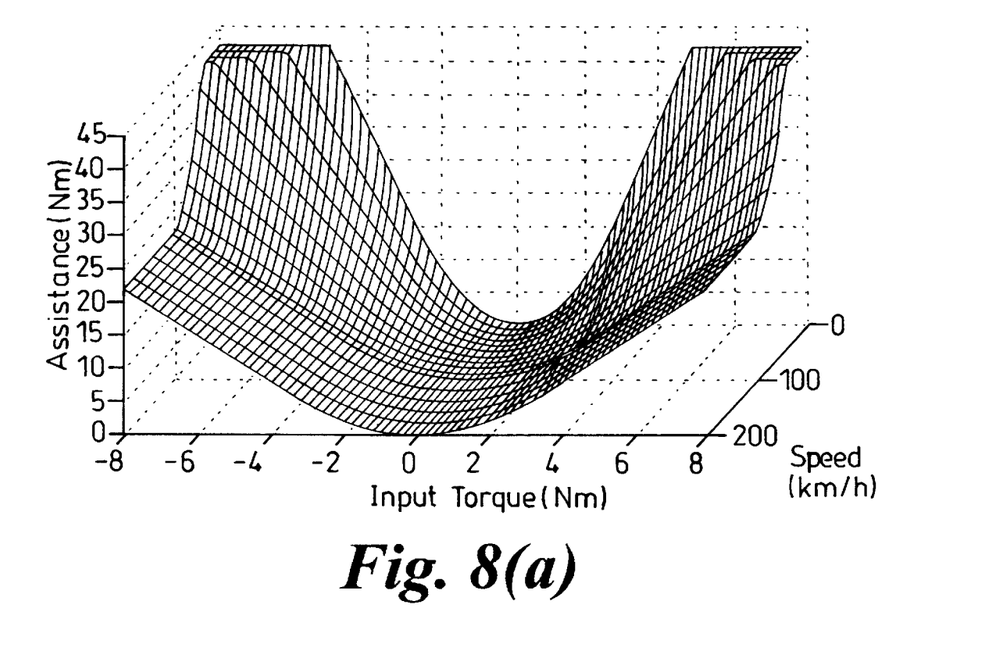
FIG. 8(a) shows a curve having one linear and one quadratic portion for different vehicle speeds.
Figure 8B:
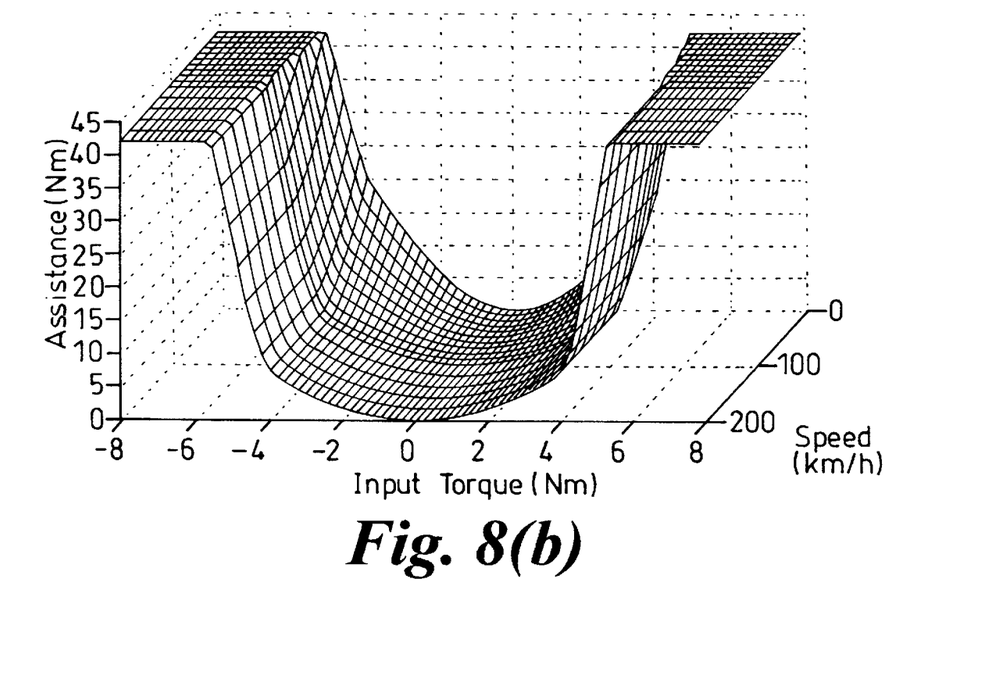
FIG. 8(b) shows a curve having two quadratic and two linear portion for different vehicle speeds.

FIGS. 8(a) and 8(b) shows a set of boost curves which vary with vehicle speed produced using the system presented in FIG. 5.

In FIG. 8(a), the second and third input torque values are set to be equal, and the first linear portion is therefore no longer required.

In FIG. 8(b), a full curve comprising two quadratic and two linear portions is shown. This allows for more flexibility in the design of the boost curve.

The scheme can be adapted to provide a driver selectable feel.

For certain vehicle applications it may be advantageous to provide the driver with the capability to select one of two predefined boost curves.

For example, one boost curve might define a low level of power assistance to implement a "sports" driver feel characteristic. The second boost curve might define a high level of power assistance to implement a "comfort" driver feel characteristic, to give very low steering efforts preferable for a vehicle used in city streets.

In such an implementation, the driver would be provided with a method of selecting the two boost curves, for example a switch on the vehicle dashboard. Other alternatives for selection include:

A momentary contact switch in which each switch press would command a change of selection of boost curve.

The facility to accept a command from another vehicle electronic control unit, for example a boost curve could be identified for an individual driver and selected when the driver's key is in the ignition.

In order to avoid sudden changes in level of power assistance that might disturb the driver were the selected boost curve to be changed at high speed during cornering for example, (and thus risk the loss of control of the vehicle), the following method is proposed to manage the switch-over between two separate tunes.

Two parameter sets are defined, one for the "sports" boost curve and one for the "comfort" boost curve. Each parameter set can be complete, in that it can separately define each of the six boost curve parameters at all vehicle speeds, for both "sports" and "comfort" boost curves. Alternatively, some parameters can be vehicle speed and/or "sports"/"comfort" independent, to simplify the vehicle tuning process and to reduce storage requirements.

Figure 6:
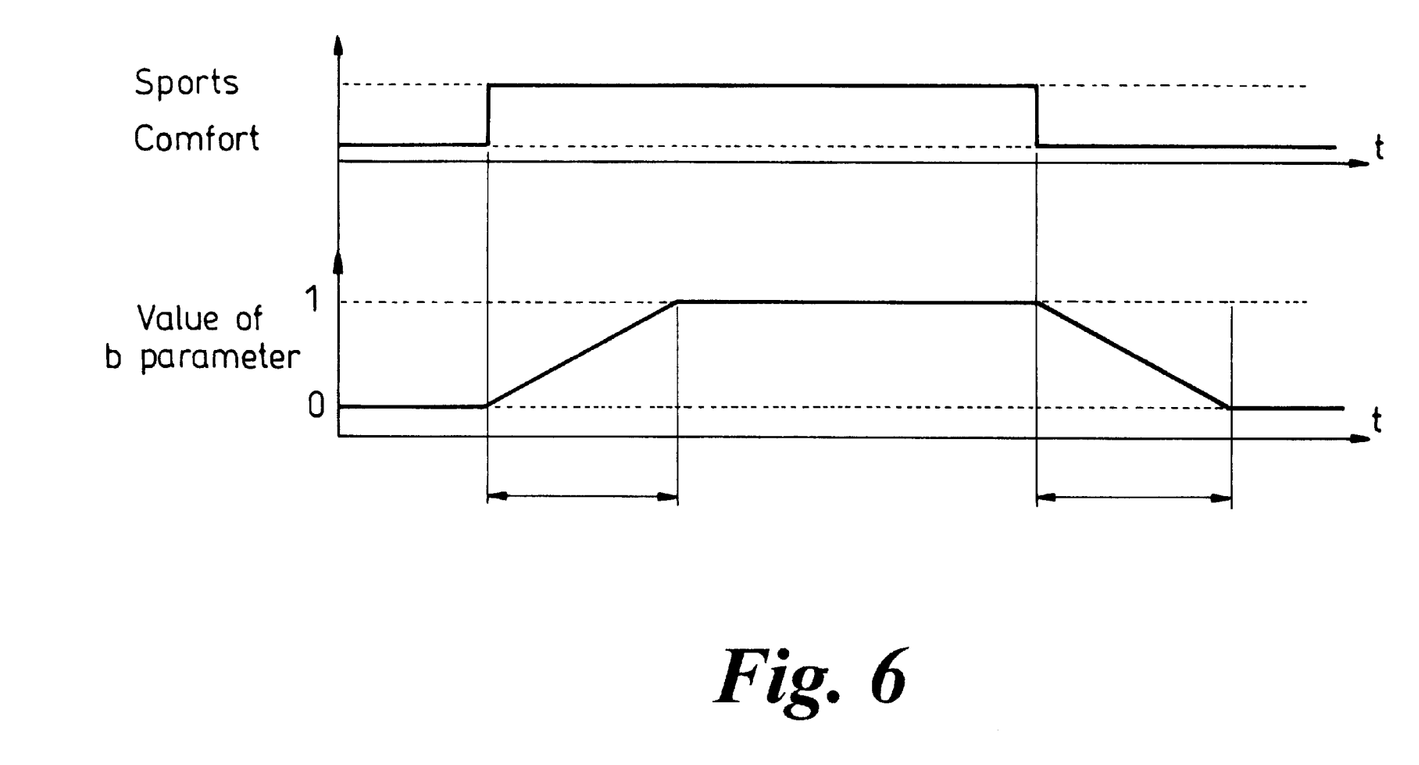
FIG. 6 illustrates the gradual variation in offset when switching from one boost curve shape to another which provides for a smooth boost curve transition.

According to the selected boost curve, a parameter b is defined. The parameter b equals 0 (zero) when the "comfort" boost curve is selected and 1 when the "sports" boost curve is selected. However, the parameter b is constrained to have a certain maximum rate of change, so that when the selected boost curve changes, b changes smoothly from 0 to 1 and vice-versa. This is illustrated in FIG. 6.

The b parameter is then used to determine an actual value for each of the six boost curve parameters, to be used to determine the boost curve to be employed at any instant.

For example, at a particular vehicle speed, suppose the $g_1$ parameter is equal to $g_{1(sports)}$ according to the "sports" boost curve and $g_{1(comfort)}$ according to the "comfort" boost curve, then the following expression is used to determine the actual $g_1$ parameter to be used:

$$g_1 = (b \times g_{1(sports)}) + [(1-b) \times g_{1(comfort)}]$$

A similar expression is used to calculate the actual value of each boost curve parameter. The boost curve is then calculated using the parameter set that has been determined in this way.

The maximum rate of change of the b parameter is set so as to determine the time over which the boost curve smoothly changes from the "sports" to the "comfort" setting when the boost curve selection is changed. For example, if the maximum rate of change of b is specified as 0.5/second, then a two second period will elapse after boost curve selection is changed before the newly selected boost curve is completely in use. In the intervening period, an actual boost curve that is between the "sports" and "comfort" boost curves will be in use.

What is claimed is:

1. An electrical power assisted steering system for a vehicle comprising an input member, an output member, an electric motor coupled to said output member and a torque sensor, said electric motor being adapted to apply an assistance torque to said output member in response to an output signal from said torque sensor indicative of a torque applied to said input member by a driver of said vehicle, in which a relationship between the indicated input torque and said assistance torque applied by said motor is defined by a boost curve that has inverse symmetry about zero input torque, and wherein the curve on each side of zero input torque comprises at least a first portion defined by a first polynomial equation corresponding to a range of input torque values between a zero value and a first value and a second portion defined by a second polynomial equation corresponding to a range of input torque values between a second value and a third value, said first portion of said curve at said first value having a gradient which is substantially equal to a gradient of the second portion of said curve at said second value, and wherein said curve further includes a third portion defined between said first value and said second value, said third portion being substantially linear.

2. An electrical power assisted steering system according to claim 1 wherein said first polynomial equation and said second polynomial equation are of different form.

3. An electrical power assisted steering system according to claim 1 wherein said first and second polynomials are quadratic functions of said input torque applied to said input member.

4. An electrical power assisted steering system according to claim 1 wherein said curve further includes a fourth portion defined between said third value and a fourth value by a linear equation.

5. An electrical power assisted steering system according to claim 4 in which said curve further includes a fifth portion which is defined between said fourth value and a maximum input magnitude having zero gradient.

6. An electrical power assisted steering system according to claim 4 in which one or more of said first, second, third and fourth values are variable in use.

7. An electrical power assisted steering system according to claim 6 wherein said one or more values that define the boost curve are variable with vehicle speed.

8. An electrical power assisted steering system according to claim 7 wherein a memory is provided and one or more of said values that define the boost curve are stored in said memory.

9. An electrical power assisted system according to claim 8 wherein the gradient of said boost curve at one or more of said first, second, third and fourth values is stored in said memory.

10. An electrical power assisted steering system according to claim 9 in which one or more of said gradient values are varied with vehicle speed.

11. An electrical power assisted steering system according to claim 8 in which the width of one or more of said portions of said boost curve is stored in said memory.

12. An electrical power assisted steering system according to claim 1 wherein a switching means is incorporated which is adapted to enable a driver to manually select between at least a first and second boost curve, the first boost curve differing from the second boost curve.

13. An electrical power assisted steering system according to claim 1 which further comprises means for automatically altering said boost curve to suit different drivers.

14. An electrical power assisted steering system according to claim 13 which further comprises means to facilitate a smooth transition from a first boost curve shape to a second boost curve shape.

15. An electrical power assisted steering system for a vehicle comprising an input member, an output member, an electric motor coupled to said output member and a torque sensor, said electric motor being adapted to apply an assistance torque to said output member in response to an output signal from said torque sensor indicative of a torque applied to said input member by a driver of said vehicle, in which a relationship between the indicated input torque and said assistance torque applied by said motor is defined by a boost curve that has inverse symmetry about zero input torque, and wherein the curve on each side of zero input torque comprises at least a first portion defined by a first polynomial equation corresponding to a range of input torque values between a zero value and a first value and a second portion defined by a second polynomial equation corresponding to a range of input torque values between a second value and a third value, said first portion of said curve at said first value having a gradient which is substantially equal to a gradient of the second portion of said curve at said second value, and wherein said boost curve is fully defined by six parameters: width of said first portion, gradient of a third portion, a second input value corresponding to the start of a second quadratic portion, the width of said second portion, the gradient of a fourth portion, and a maximum boost curve output torque which defines a fourth input value, said six variables being stored in a memory, and in which means are provided to construct said boost curve from said six parameters.

* * * * *